United States Patent Office 3,808,265
Patented Apr. 30, 1974

3,808,265
PREPARATION OF 2-HALOETHYLPHOSPHONIC ACID
David I. Randall and Calvin Vogel, Easton, Pa., assignors to GAF Corporation, New York, N.Y.
No Drawing. Filed Mar. 26, 1971, Ser. No. 128,559
Int. Cl. A01n 5/00; C07f 9/38
U.S. Cl. 260—502.4 R         6 Claims

ABSTRACT OF THE DISCLOSURE

A process for the preparation of 2-haloethylphosphonic acid of the formula:

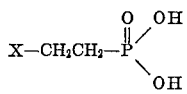

wherein X is chlorine or bromine, which comprises hydrolyzing an ester of the formula:

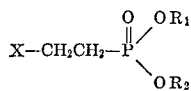

wherein X is defined above and each R is individually selected from the group consisting of alkyl, haloalkyl and hydroxyalkyl, wherein each alkyl group contains from 1 to 8 carbon atoms at elevated temperature, with aqueous hydrochloric acid maintained at a concentration of at least 23% by injection of hydrogen chloride under pressure during the reaction, whereby the desired product is obtained in high yields and side-reactions leading to unwanted 2-hydroxyethylphosphonic acid are minimized.

FIELD OF THE INVENTION

This invention relates to an improved process for the preparation of 2-haloethylphosphonic acids by hydrolysis of ester precursors.

DESCRIPTION OF THE PRIOR ART 2-haloethylphosphonic acids are known as valuable plant growth stimulants. These compounds, particularly 2-chloroethylphosphonic acid, have been used extensively as plant growth hormones for increasing crop yields of, for example, pineapples, soy beans and the like. The use of these compounds is described for example in Nature, vol. 218, p. 974 (1968), by Cooke and Randall.

Known procedures for preparing these compounds have not been satisfactory from the standpoint of economy and product purity. One known procedure involves hydrolysis of a diester of a 2-haloethylphosphonic acid to the desired 2-halophosphonic acid with aqueous HCl under atmospheric pressure. The yields and product purity from this process are too low for it to be considered commercially useful.

Still another method of preparing 2-chloroethylphosphonic acid, and one which improves the yield and purity of the product, is a hydrolysis method disclosed in commonly assigned application Ser. No. 867,357 filed Oct. 17, 1969 entitled Preparation of Haloethane Phosphonic Acids. This method differs from the previously known hydrolytic procedure in conducting the reaction between the diester and excess concentrated HCl under autogenous or greater pressure in a sealed pressure reactor. The advantage of this procedure over the open reactor hydrolysis procedure is asserted in the copending application to be the avoidance of large amounts of impurities such as bis(2-haloethyl) vinylphosphonates, their oligomers, as well as monoesters of 2-haloethylphosphonic acid and β-hydroxyethylphosphonic acid.

While the above sealed reactor hydrolysis procedure leads to greater yields of pure 2-chloroethylphosphonic acid than the open reactor method, the resultant reaction product nevertheless contains higher levels of toxic impurities than are desirable for application to food crops. Also, the formation of impurities raises production cost of the desired 2-chloroethylphosphonic acid. Moreover, the sealed reactor method is time consuming: two or more days being required for yields approximating 80%. Additionally, since excess HCl is required to inhibit formation of 2-hydroxyethylphosphonic acid and it is charged as aqueous acid into the reactor at the start of the reaction a large volume of water is inherently present, leading to wasted reactor capacity and expensive product-water separation procedures.

SUMMARY OF THE INVENTION

In view of the foregoing, it is an object of this invention to provide a process by which the diesters of 2-haloethylphosphonic acid can be hydrolyzed to 2-haloethylphosphonic acid in good yields and high purity.

It is a further object of this invention to provide a process wherein the hydrolysis reaction is carried out in a short period of time without the use of large amounts of water to form the desired product while minimizing the formation of undesirable impurities and avoiding the need to remove large amounts of water from the product.

Other objects of the present invention will become apparent from the following description of the invention.

The foregoing objects are accomplished in accordance with this invention by a process which comprises reacting an ester of 2-haloethylphosphonic acid with aqueous HCl of at least 23% concentration while injecting hydrogen chloride under a pressure sufficient to replenish reacted HCl and maintain the concentration of aqueous HCl above about 23%.

It has now been found that if the hydrolysis of the 2-haloethylphosphonic acid ester is conducted in concentrated hydrochloric acid and sufficient anhydrous HCl gas is introduced into the reaction mixture during the course of the hydrolysis, a competing reaction, which leads to the formation of unwanted impurities, is minimized and high yields of the desired product are obtained.

The desired conversion of 2-haloethylphosphonic acid esters proceeds, as is well known, in accordance with the Equation A:

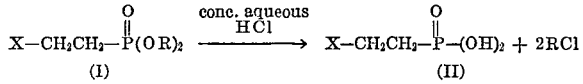

wherein X is halo (e.g., chloro or bromo) and each R is individually alkyl, haloalkyl or hydroxyalkyl of 1–8 carbons. Although only two moles of HCl are required, it is usual to have excess HCl present in the initial reaction mixture, viz: 3–6 moles of HCl per mole of ester I. After the reaction has proceeded to near completion, the initial amount of HCl has become depleted by about 2 moles, thus leaving 1–4 moles of HCl in the same volume of water. The concentration of aqueous HCl ranges from about 12 to about 23% and under these conditions of relatively low HCl concentration, a competing reaction assumes significant importance. The 2-haloethylphosphonic acid (II) product begins to hydrolyze to the 2-hydroxyethylphosphonic acid III as shown in the following Equation B:

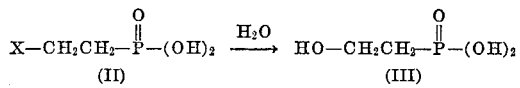

Reaction B thus consumes the desired β-haloethylphosphonic (II) acid and produces the toxic β-2-hydroxyethylphosphonic acid (III), both of which results are highly undesirable and substantially avoided by the present invention.

The process of this invention is conducted by charging an ester of Formula I and concentrated aqueous hydrochloric acid into a pressure reaction vessel fitted with heating means and means for introducing HCl during the course of the reaction. The reaction between the ester and hydrochloric acid theoretically requires 2 moles of HCl per mole of ester to produce the corresponding diacid III. In addition, following this invention, sufficient excess HCl is required to maintain the HCl concentration in the aqueous phase above about 23%, preferably above 30% and most preferably above 35%, during the course of the reaction. Initially, the reaction mixture need not have even the theoretical amount of HCl, since all or any part of the required HCl can be injected during reaction. However, it is most convenient to start with a reaction mixture containing aqueous, and most preferably concentrated aqueous, HCl, rather than water or dilute HCl, since the ester is not soluble in water or dilute acid.

The initial amount of water is not of critical importance. It is only necessary to have present as much as is required to assure intimate contact between the ester and the aqueous acid. It is desirable in order to enhance the reaction rate, to have at least two moles and preferably at least 5 moles of water per mole of ester. Larger quantities of water, e.g., more than 10 moles per mole of ester, in the reaction mixture have no adverse effect upon reaction rate, but do detract from reaction efficiency and contribute to the problem of stripping water from the final product.

The reaction is conducted at elevated temperatures of from about 100° to 145° C., preferably about 110° to 130° C., under sufficient HCl pressure, by incremental addition of HCl gas, to maintain the aqueous acid concentration at above about 23%, which pressure may be as high as the reactor can tolerate, e.g., up to about 500 p.s.i.g. or higher. Pressures of about 50–90 p.s.i.g. during at least a major portion of the reaction time are preferred. The reactor can be a glass lined autoclave of the type well known to the art.

On completion of the reaction as indicated for example by cessation of pressure drop, the mixture is cooled and the desired product isolated in known manner from the two-phase mixture consisting of an aqueous phase containing the 2-haloethylphosphonic acid, and an organic phase comprising "RCl" wherein R is as defined above. By drawing off the organic layer and stripping water from the remaining aqueous layer, the desired 2-haloethylphosphonic acid is obtained in relatively pure form.

The following examples are presented only to illustrate the present process. All parts and proportions herein and in the appended claims are by weight unless otherwise indicated.

EXAMPLE 1

A one gallon stirred glass lined autoclave was charged with 807 g. (3 moles) of bis-(2-chloroethyl-2-chloroethylphosphonate and 900 cc. of 37% hydrochloric acid. The autoclave was then heated to 120° C. over a two-hour period, resulting in a pressure of about 84 p.s.i.g., and then at 120° C. for twelve hours. During the first half hour, the pressure dropped to below about 50 p.s.i.g., the pressure being raised every half hour to about 90 p.s.i.g. by addition of dry HCl gas. The pressure thereafter did not drop below about 70 p.s.i.g. Eighty-four grams of HCl were taken up upon completion of the reaction, indicated by cessation of drop in pressure. On cooling to room temperature, a two-phase liquid product was obtained. The upper layer of ethylene dichloride weighed 540 g. On flash evaporation of the lower aqueous phase at 60° C. there was obtained 432 g. of product containing 87.7% of 2-chloroethylphosphonic acid, 2.4% 2-hydroxyethylphosphonic acid and 1.8% mono-2-chloroethylester of 2-chloroethylphosphonic acid.

EXAMPLE 2

The procedure in Example 1 was followed except that 1076 g. (4 moles) of phosphonate were employed. The reaction time was 14 hours at 120° C. There was obtained 750 g. ethylenedichloride and 576 g. of product containing 86.7% 2-chloroethylphosphonic acid, 0.6% 2-hydroxyethylphosphonic acid and 1.6% mono-2-chloroethylester of 2-chloroethylphosphonic acid.

EXAMPLE 3

The procedure in Example 1 was followed except that the charge was 1450 g. (5.4 moles) of bis-(2-chloroethyl) 2-chloroethylphosphonate and 450 cc. of 37% HCl. After reaction at 120° C. for 24 hours, there was obtained 950 g. of ethylenedichloride and 827 g. of product containing 87.2% 2-chloroethylphosphonic acid, 0.7% 2-hydroxyethylphosphonic acid and 3.0% mono-2-chloroethylester of 2-chloroethylphosphonic acid.

COMPARATIVE EXAMPLE 4 (ATMOSPHERIC PRESSURE)

A mixture of 53.8 grams (0.2 mole) of bis-(2-chloroethyl) 2-chloroethylphosphonate, 50 ml. (0.6 mole) of concentrated HCl (37%) and 40 ml. of water was refluxed for two days. The ethylene dichloride that was produced was continuously removed. A total of 16.7 ml. was collected (51% of theory). An aliquot was removed from the reaction mixture after a day and the solvent stripped off. A second sample was obtained after two days by solvent stripping.

Analysis of the one day sample showed about 58% diacids (2-chloroethyl- and 2-hydroxyethyl-phosphonic acids) and about 30% monoester.

Analysis of the two days sample showed 96.4% diacids (74.0% of 2-chloroethylphosphonic acid, 22.4% of 2-hydroxyethylphosphonic acid) and 3.5% of the mono-2-chloroethyl ester of 2-chloroethylphosphonic acid.

COMPARATIVE EXAMPLE 5 (SEALED REACTOR-AUTOGENOUS PRESSURE)

A one gallon glass lined autoclave was charged with 807 grams (3 moles) of bis-(2-chloroethyl) 2-chloroethylphosphonate and 900 ml. of conc. (37%) hydrochloric acid. The autoclave was heated, with stirring, for 18 hours at 120° C. The maximum pressure during the run was 84 p.s.i.g. On cooling, a two phase liquid product was obtained. The upper layer was ethylene dichloride and weighed 375 grams. The solvent was removed from the lower aqueous layer by flash evaporation leaving 527.5 grams of solid product. Titration showed 98.7% of diacids and 0.83% monoester in the product. Analysis of the diacids showed that it consisted of 91.9% 2-chloroethylphosphonic acid and 8.1% of 2-hydroxyethylphosphonic acid.

From the foregoing it can be seen that the process of the present invention provides an advantageous route to 2-haloethylphosphonic acid, relatively low in 2-hydroxyethylphosphonic acid impurity. High yields are obtained in relatively short reaction times and a relatively small amount of water suffices to give relatively high reaction rates. Two advantages flow from this fact. Less reactor space is taken up with water thereby permitting conversion of more diester starting material per unit volume of reactor, and less water must be removed from the aqueous phase of the reaction product to give the desired 2-haloethylphosphonic acid. Thus the process of this invention gives a product of higher purity at lower cost than was previously attainable.

Though the present invention has been described with respect to certain preferred embodiments, it should be understood that these embodiments can be modified and still fall within the scope of the present invention. Other ester starting materials such as di-(bromo lower-alkyl), di-(hydroxy lower-alkyl) and di-(lower alkyl) esters of 2-haloethylphosphoric acids may be used with equivalent results such as bis-(2-bromomethyl), -(8,5, or 2 chlorooctyl), - (hydroxyethyl), -(8, 4 or 2-hydroxyoctyl), -(methyl), -(ethyl), and -(isooctyl) esters of 2-chloroethyl and 2-bromoethyl phosphonic acid, the corresponding mixed diesters, and diesters of the above structural formula wherein $R_1$ and $R_2$ together represent a divalent $C_{2-6}$ alkylene chain, optionally with OH and/or halo substituents, forming a heterocycle with the depicted P atom.

It will also be understood that the incremental addition of HCl gas required in accordance with this invention may be continuous or periodic. Thus, with use of automatically controlled equipment, the reactions in Examples 1–3 above may be conducted during at least a major portion of the reaction time at any desired pressure, continuous or variable and preferably in the range of about 50 to 90 p.s.i.g., by automatically controlled injection of HCl gas as needed during the reaction. It will accordingly be apparent that the present process may be described, from an operational or instructional viewpoint, as a hydrolysis of the above-defined diester of 2-haloethylphosphonic acid by incremental addition into a pressure-tight reactor containing said diester and aqueous hydrochloric acid of at least about 23%, preferably at least about 30%, and more preferably at least about 35% conc., at a temperature of about 100° to 145° C., preferably about 110° to 130° C., of sufficient HCl gas to maintain in said reactor a pressure of at least about 50 p.s.i.g., preferably about 50 to 90 p.s.i.g., and more preferably about 70 to 90 p.s.i.g., during at least a major portion of the reaction time.

Other modifications and variations will become obvious to those skilled in the art and are to be included within the spirit and purview of this application and the scope of the appended claims.

What is claimed is:

1. A process for the preparation of 2-chloroethylphosphonic acid which comprises reacting bis (2-chloroethyl) 2-chloroethylphosphonate and concentrated aqueous hydrochloric acid under pressure of injected hydrogen chloride gas sufficient to replenish reacted HCl and maintain the concentration of the aqueous hydrochloric acid above about 23% at a temperature of about 100° C. to 145° C., cooling the reaction product to obtain a 2 phase liquid system consisting of an aqueous phase containing the 2-chloroethylphosphonic acid and an organic phase containing ethylenedichloride, drawing off the ethylenedichloride phase and recovering the 2-chloroethylphosphonic acid from the aqueous phase.

2. The process of claim 1 wherein the pressure during the reaction is maintained above about 50 p.s.i.g.

3. The process of claim 2 wherein the reaction is carried out at a temperature of about 110° C. to 130° C.

4. A process as defined in claim 1 wherein the concentration of said aqueous hydrochloric acid is maintained at above 30%.

5. A process as defined in claim 1 wherein the concentration of said aqueous hydrochloric acid is maintained at above 35%.

6. A process for the preparation of 2-chloroethylphosphonic acid which comprises hydrolyzing bis(2-chloroethyl)-2-chloroethylphosphonate by incremental addition into a pressure-tight reactor containing said phosphonate and aqueous hydrochloric acid of at least about 23% concentration, at a temperature of about 100 to 145° C., of sufficient HCl gas to maintain in said reactor a pressure of at least about 50 p.s.i.g. during at least a major portion of the reaction time, cooling the reaction product to obtain a two-phase liquid system consisting of an aqueous phase containing the 2-chloroethylphosphonic acid and an organic phase containing ethylene dichloride, drawing off the ethylene dichloride phase and recovering the 2-chloroethylphosphonic acid from the aqueous phase.

References Cited
UNITED STATES PATENTS

| | | | |
|---|---|---|---|
| 2,288,865 | 7/1942 | Baehr et al. | 23—154 |
| 3,304,330 | 2/1967 | Yoke et al. | 260—502.4 R |
| 3,316,331 | 4/1967 | Sims | 260—502.4 R |
| 3,184,496 | 5/1965 | Baranauckas et al. | 260—502.4 R |
| 3,242,647 | 3/1966 | Alkemade et al. | 23—154 |

OTHER REFERENCES

Kabachnik et al.: "Chem. Abstracts," vol. 42 (1948), columns 7241–3.

Fansteel, J., technical bulletin, pp. 1–8, an undated publication apparently printed about 1940.

JOSEPH E. EVANS, Primary Examiner

U.S. Cl. X.R.

71—86; 260—633, 652 R, 664, 983